United States Patent Office 3,551,556
Patented Dec. 29, 1970

3,551,556
**CARRIERS FOR BIOLOGICALLY
ACTIVE SUBSTANCES**
Karel Kliment, Jiří Vacík, Zdenek Ott, Vladimír Majkus, Vladimír Stoy, Miroslav Stol and Otto Wichterle, Prague, Czechoslovakia, assignors to Ceskoslovenska akademie ved, Prague, Czechoslovakia
No Drawing. Filed Jan. 6, 1967, Ser. No. 607,637
Claims priority, application Czechoslovakia,
Jan. 6, 1966, 83/66
Int. Cl. A61k 27/12
U.S. Cl. 424—21       3 Claims

ABSTRACT OF THE DISCLOSURE

Drugs are released gradually to a living organism after oral ingestion, implantation, or external application to the skin or a mucous membrane through a layer of a non-ionogenic, neutral hydrogel of a polymer of ethylene glycol methacrylate or similar monomer cross-linked sufficiently to make the polymer insoluble in all body liquids. The drug may be distributed in the monomer mixture prior to polymerization or enveloped by an outer coating of the hydrogel.

---

This invention relates to medicinal preparations from which the active ingredient is slowly released, and particularly to carriers for medicinal preparations which gradually release the active ingredients.

In some applications, biologically or physiologically active substances such as drugs must be delivered gradually and, as far as possible, continuously to the tissue or to the blood stream of a living being.

It has been proposed to use soluble linear polymers as drug carriers, the drugs being bound to the polymer by ionic or coordination bonds. There were also tested water-soluble polymers having drug molecules bound to the macromolecular chains by covalent bonds.

There were also proposed polymeric salts of basic antibiotics, such as tetracycline, with water soluble anion exchangers, e.g. with linear polyacrylic and polymetacrylic acids. It is a common disadvantage of all linear polymers whose main chain entirely consists of carbon atoms that they resist enzymatic decomposition. They are therefore accumulated mainly in lymphatic glands.

All water-soluble macromolecular drug carriers are incapable of penetrating the cell membranes, and thus accumulate mainly in lymphatic glands. This is advantageous only for treating infectious diseases of said glands but not for treating other organs. Water-soluble macromolecular drug carriers have therefore not found broad use in human medicine.

The object of the invention is the provision of polymeric carriers for biologically active substances, which are fully insoluble in the liquids of the body, but strongly swell therein. Biologically active substances are not usually bound chemically to the carrier of the invention and enter the organism by physical processes, i.e. by dissolution and diffusion. The carriers according to the invention are three-dimensional hydrophilic polymers, either homogeneous or heterogeneous, physiologically inert and thus innocuous. A typical example is copolymer of glycol methacrylate, crosslinked with a small amount, from about 0.1 to about 5% of glycol dimethacrylate, whereat "glycol" means not only ethylene glycol, but also polyglycols, copolymers of ethylene- or polyethylene glycols with propylene glycol, and other water soluble dihydric alcohols. Glycolmonomethacrylate or glycolmonoacrylate can be partly or fully replaced by other neutral hydrophilic, physiologically inert monomers such as methacrylamide or acrylamide. Glycols can be, if desired, partly or fully replaced by other polyols such as glycerol, mannite, or pentaerythritol. Glycol dimethacrylate can be replaced by any other suitable sufficiently hydrophilic crosslinking agent such as by a low-molecular polyester of an unsaturated dicarboxylic acid, e.g. maleic or itaconic acid, or by N,N'-methylene-bis-methacrylamide or similar.

Biologically active substances can be absorbed by the polymeric hydrophilic carrier or freely deposited in any place therein, e.g. in its center, either as a solid or as a dispersion, or in the form of a solution. In contact with living tissue, a mucous membrane or skin the biologically active substances diffuse gradually into the body. The amount of the active substance penetrating into the organism in a time unit can be determined in advance according to the known, measured diffusion rate, the thickness of the polymer layer, the size of the contact surface and the concentration difference. The diffusion rate is influenced by the structure of the polymer, particularly by the crosslinking degree and the presence or absence of visible pores (macroporosity). The structure can be changed by choosing the conditions of polymerization.

The carriers can be implanted subcutaneously, constitute a part of a prosthesis, or inserted in a cavity of the human body. A planary carrier body of the invention may be placed in contact with skin, with a mucous membrane or with surface wounds. If an implant of the invention is readily accessible, the physiologically active substance, when exhausted, can be replenished by using a hypodermic needle. In this way it is also possible to use two or more different active substances sequentially.

Physiologically active substances which can be applied with the carriers of the invention include antibiotics, antianaemics, anticoagulants, antimycotics, antiphlogistics, disinfectants, chemotherapeutics, hemostatics, cytostatics, hormones, and other preparations for external or internal use.

Granular non-ionogenic, neutral, insoluble hydrogels of the invention which are capable of swelling, are suitable particularly for oral or, in some cases, also for intramuscular application. When used, with a well defined and previously determined grain size distribution, a desired release rate of the biologically active substance during the dwell of the carrier in the body or in contact therewith can be achieved.

The hydrogels of the invention are cross-linked and thus insoluble. They are hydrophilic and capable of receiving at least 5% of water in human gastro-intestinal tract. When still capable of swelling, a granular carrier is not in equilibrium with water or with the liquids of the gastro-intestinal tract when ready for oral application.

The rate at which physiologically active substances are released depends, under otherwise constant conditions, on the grain size, i.e. on the ratio between the surface and the volume of the particle. Small grains release the sorbed substance sooner than large ones. The maximum of concentration is also reached sooner, and the substance is sooner exhausted.

Assorted sets of granules are prepared by means of sieves, the granules are saturated with the biologically active substance and its desorption is determined experimentally. For instance, a solution of a drug containing radioactive isotopes is soaked into individual fractions which are placed in the stomach of experimental animals. Then the concentration in the blood is measured over the entire period, in which the carrier remains in the gastro-intestinal tract of the animal.

In this way curves of concentration vs. time are obtained for all fractions. From these curves an optimal curve corresponding to a desired effect is composed either by computing or by a geometrical construction, yielding the percentual amounts of single fractions which are to be mixed in order to obtain the desired curve.

It is important to introduce the hydrophilic crosslinked carrier into the gastro-intestinal tract or into a muscle in a state in which it is still capable of swelling, so that the concentration of the released drug decreases slowly or, if the swelling capacity is great enough, increases from an initial comparatively low value to a maximum. By choosing the distribution according to predetermined schedule it is possible to obtain any desired change of concentration with time.

For intramuscular application granular gels of the invention may be suspended in oil or in glycerol, or even in aqueous solutions, if the carrier is previously saturated with e.g. glycerol and the aqueous suspension is prepared immediately before the application.

For applications in which the carrier according to the invention makes direct contact with living tissue or mucous membranes other than those of the gastro-intestinal tract, it is advantageous to provide an outer layer of a neutral, non-ionogenic hydrogel such as the copolymer of a glycol methacrylate or acrylate with a small amount of a neutral cross-linking agent such as glycol bis-methacrylate. Neutral, inert hydrogels are well tolerated by the organism.

EXAMPLE 1

One gram chloramphenicol was dispersed in 2 ml. of redistilled water and 0.72 ml. of the dispersion was added to 4 ml. of a mixture of 30 parts of ethylene glycol monomethacrylate containing 0.3% of ethylene glycol bis-methacrylate, and 20 parts of diethylene glycol monomethacrylate. Then 0.25 ml. of dimethylaminoethyl acetate and 0.03 ml. of an aqueous 40% ammonium persulfate solution were added with stirring. 4.5 ml. of this mixture were left to polymerize in a glass mold 60 x 60 mm. under carbon dioxide at room temperature. The copolymerization was completed in 15 minutes. A sample was cut out with a scalpel and transferred to a glass flask under sterile conditions. It was then tested by the disc diffusion method for its microbiological effects.

The polymerization method can be modified by using other redox catalysts, or peroxide alone such as di-isopropyl percarbonate which forms free radicals at temperatures above 50° C. A large amount of water or of a hydrophilic liquid such as glycerol or ethyleneglycol can be added to the polymerization mixture. The ethyleneglycol bis-methacrylate may be replaced by another cross-linking agent such as N,N'-methylene-bis-methacrylamide, and the monomers can be partly or wholly replaced by methacrylamide or other hydrophilic mono-olefinic as mentioned above.

EXAMPLE 2

A mixture of 70% distilled water and 30% ethyleneglycol monomethacrylate, containing 0.24% of monoethyleneglycol bis-methacrylate, was mixed with 0.5% of a two-percent aqueous solution of ammonium persulfate and 0.1% dimethylaminoethyl acetate. Then 1.5% of an aqueous dispersion of chloramphenicol was added, the mixture was well stirred and poured into a flat glass mold blanketed with carbon dioxide. The mold was left for 3 hours at room temperature. The microporous sponge thus formed could be used for treating burns.

EXAMPLE 3

A tablet of 1-gamma-oxobutyl-2,5-dioxo-3,4-diphenyl pyrazolidine (ketophenylbutazone), coated with a mixture of polyvinyl alcohol and glycerol which dissolves very slowly in the monomer mixture of Example 2, was held in the polymerizing mixture until it was coated with a 3–4 mm. thick layer of microporous hydrogel. It was washed in 96% ethanol to remove residual polymerization initiator, dried in order to remove the alcohol, and shortly rinsed with a 0.8% aqueous solution of sodium chloride under sterile condition. The coated tablet was then implanted under the skin on the knee of a patient suffering from gout. The drug gradually dissolved, and its concentration in the region of the afflicted knee was much higher than in other parts of the patient's body. When the drug was exhausted, after several weeks, it was replenished by injecting an aqueous suspension of the same into the hydrogel implant which was removed after the cure. The same result could have been obtained by oral application of at least 20 tablets of the same drug at risk of an undesired decrease in the amount of red bloodcells.

The mixture of polyvinyl alcohol and glycerol is prepared at elevated temperature, polyvinyl alcohol precipitating as a fine suspension when the mixture is cooled, other polymers dissolving or swelling in water but insoluble in organic solvents, such as gelatine, carboxymethyl cellulose and other harmless natural or synthetic polymers can be used instead.

EXAMPLE 4

A spongy hydrogel was prepared according to Example 2, squeezed out and soaked in a concentrated aqueous solution of tetracycline hydrochloride. Then a cut and weighed piece of the impregnated sponge is coated with a thin polyvinylalcohol layer in the manner described in Example 3 and suspended by means of a thread of carboxymethyl cellulose in a glass mold, which is then filled with a mixture of 55% ethyleneglycol monomethacrylate, 20% diethyleneglycol monomethacrylate, 0.3% ethyleneglycol bis-methacrylate, 0.8% of a 2% aqueous potassium persulfate solution, 0.5% of a 2% aqueous solution of potassium pyrosulfite, 0.01% of 0.1% aqueous copper sulfate (pentahydrate) solution and 23.39% of distilled water. The mixture polymerizes readily under an inert atmosphere at room temperature. The mold with the polymerized mixture is then immersed in ethanol whereby the polymer is released from the mold and the residual catalyst is washed out. Ethanol is removed either by evaporation or by immersion of the hydrogel in cold water. Prior to subcutaneous implantation the hydrogel body is immersed in physiological salt solution. The entire procedure is carried out under sterile conditions. The diffusion rate of the antibiotic depends on the thickness of the surface layer of transparent hydrogel.

EXAMPLE 5

A large crystal of Glauber's salt (sodium sulfate dekahydrate) is embedded in a polymerizing mixture of 75% ethyleneglycol monomethacrylate, 0.3% ethyleneglycol bis-methacrylate, 0.25% di-isopropyl percarbonate and 24.5% anhydrous glycerol, at 55–60° C. under carbon dioxide. After copolymerization, the mold with the copolymer is immersed into hot water and thoroughly washed. Into the cavity left by the dissolved crystal a suspension of a hormone is introduced by means of a syringe. The sterile body, brought to equilibrium with a sterilized physiological salt solution, is implanted under the skin to produce effects for several months. After exhaustion of the hormone, another dose of biologically active material can be injected into the same cavity in the implant after removal of body liquid therefrom by suction.

EXAMPLE 6

20–30 layers of gauze of the type used for dressings are soaked with a mixture of 40% ethylene glycol monomethacrylate, 0.2% ethyleneglycol bis-methacrylate and 59.8% distilled water freshly mixed with 0.5% each of a 4% aqueous potassium pyrosulfite solution and of a 4% aqueous potassium persulfate solution. The procedure is carried out in a closed glass case filled with carbon dioxide, by means of rubber sleeves and gloves covering the hands of the operator. The impregnated gauze is laid onto a positive plaster molding of a face after the viscosity of the mixture rises sufficiently to avoid dripping. After the polymerization the gauze mask obtained is filled with spongy hydrogel, which, after having been washed and squeezed out, is capable of holding a considerable amount of biologically active substances for treating skin diseases and for cosmetic purposes.

EXAMPLE 7

A polymerization mixture according to Example 6 is poured onto a flat glass mold and left to polymerize under an inert gas at room temperature. After having been thoroughly washed and squeezed out, the spongy hydrogel is impregnated with an aqueous or alcoholic solution of a biologically active substance such as cortisone or an ovarial or androgenic hormone. The foil of appropriate size, about 10 mm. thick, is placed under an elastic dressing e.g. on the inner side of a thigh. In the same way some neoplastic skin diseases can be treated with 6-azauridine riboside. After some time the spongy hydrogel can be washed again, sterilized in boiling water, squeezed out under sterile conditions, soaked again in a biologically active substance and re-used for the same or for another patient.

EXAMPLE 8

A porous hydrogel capable of exchanging cations is prepared by copolymerizing a mixture of 35 parts of methacrylic acid, and 30 parts of a 25% aqueous solution of maleic anhydride. The copolymerization is carried out in the absence of free oxygen with a redox initiator consisting of 5 parts of a 5% ammonium persulfate aqueous solution and 2 parts of dimethylaminoethyl acetate. After having been washed in 5% hydrochloric acid and several times in distilled water the squeezed out porous hydrogel can be soaked in a solutiton of a basic drug, e.g. oxytetracycline, whereby a part of the drug is bound by ionic bonds, the remainder being absorbed and adsorbed. The impregnated porous spongy hydrogel is then coated with polyvinyl alcohol or gelatine and embedded in a transparent hydrogel prepared according to Example 5. After having been washed in 96% ethanol and then in sterile physiological solution the body is implanted for delivering the drug into the blood stream. The drug concentration soon reaches a maximum and then decreases according to a flat logarithmic curve.

EXAMPLE 9

A copolymer is prepared from 97 parts of ethylene glycol monomethacrylate, 2 parts of methacrylic acid and 1% of ethylene glycol bis-methacrylate by suspension-polymerization in a concentrated, aqueous sodium chloride solution, using 0.05 part of di-isopropyl percarbonate as a polymerization initiator. The copolymer beads, 0.1 to 2.0 mm. in size, are thoroughly washed and then soaked in a saturated aqueous solution of tetracycline hydrochloride. After a week, when even the largest particles have reached equilibrium with the solution, the surplus solution is centrifuged or sucked off and the polymer is dried at low pressure at 40° C. The polymer is then divided by means of calibrated sieves into three fractions: I (0.1–0.5 mm.), II (0.5–1 mm.), III (1–2 mm.). To obtain protracted activity through the entire gastro-intestinal tract after oral application, a mixture of 1 part of I, 0.5 part of II and 3 parts of III is used.

The invention should not be restricted by the above examples which are only illustrative. It is apparent that through a porous hydrogel the active substance will diffuse at a higher rate than through a homogeneous one. Thus, the structure and the thickness of the hydrogel layer through which the active substance has to penetrate into the living tissue, and also the place where the carrier is applied, are chosen according to the solubility and activity of the active substance, in order to secure the optimum, previously determined dependence of concentration on time. The carrier, either in the form of a single shaped body or in the form of granules having a definite size-distribution characteristic, forms a barrier through which the biologically active substance has to penetrate by diffusion, the rate of diffusion being either established by an experiment in vitro or in vivo, or computed on the base of known solubility of the active substance and permeability of the hydrogel.

It is to be understood that granular carriers intended for treating diseases of the gastro-intestinal tract can also be coated with known acid-resistant coatings.

The carriers according to the invention can be also used in suitable shapes as inert intravaginal or intrauterinal pads containing antibiotics, disinfectants and also anticonception agents.

In the treatment of local tuberculosis of bones or glands a carrier according to the invention may be impregnated with a tuberculostatic agent such as nicotinic acid hydrazide or p-amino salicylic acid, and implanted in the neighborhood of the sick organ in order to provide as high concentrations of the drug in the centre of the disease as possible, without flooding the whole organism with the same. Such high local concentrations of the drug are not possible without toxic effects on other organs, such as the kidneys, by oral or conventional parenteral application.

We claim:

1. Insoluble, molded, accessible, removable, and refillable microporous hydrogel sponge, microporous spongy hydrogel, subcutaneous drug implant tablet, or spongy hydrogel multi-layer hydrophilic gauze dressing carriers molded under sterile conditions, of biologically active, at least partly soluble substances, for delivering them in living organisms in direct contact therewith, consisting of sparingly cross-linked hydrogels prepared by copolymerization of hydrophilic mono-olefinic monomers selected from the group consisting of ethylene glycol monomethacrylate, ethylene glycol monoacrylate, polyethylene glycol monomethacrylate, polyethylene glycol monoacrylate, monomethacrylates and monoacrylates of ethylene glycol-propylene glycol copolymers, methacrylamide, acrylamide, and mixtures thereof, with 0.1–5.0 percent of cross-linking agents selected from the group consisting of ethylene glycol bis-methacrylate, N,N'-methylene bis-methacrylamide, and low-molecular polyesters of maleic acid and itaconic acid, and with biologically active substances insensitive to polymerization catalysts and other conditions of polymerization and which are introduced immediately into the monomer mixture during polymerization, so that at least a substantial part thereof has to diffuse through a definite thickness of the swollen hydrogel, said thickness and diffusion rate being previously determined and tested to secure controlled delivery of the biologically active substance to the organism according to a predetermined schedule.

2. Insoluble carriers of biologically, at least partly soluble substances according to claim 1, where the core, containing the biologically active substance, consists of a macroporous hydrogel, whilst the outer layer consists of homogeneous, transparent hydrogel.

3. Insoluble carriers of biologically, at least partly soluble substances according to claim 1, where the biologically active substance is embedded in a cavity formed in the interior of a hydrogel body.

References Cited

UNITED STATES PATENTS

| | | | |
|---|---|---|---|
| 2,980,655 | 4/1961 | Glass et al. | 424—81X |
| 3,121,043 | 2/1964 | Tobin et al. | 424—81X |
| 3,178,350 | 4/1965 | Lund | 424—81 |
| 3,329,574 | 7/1967 | Barron et al. | 424—37 |
| 3,390,050 | 6/1968 | Speiser | 424—81X |
| 2,976,576 | 3/1961 | Wichterle et al. | 18—58 |
| 3,220,960 | 11/1965 | Wichterle et al. | 260—2.5 |
| 3,247,066 | 4/1966 | Milosovich | 424—35X |
| 3,400,890 | 9/1968 | Gould | 239—36 |
| 3,428,043 | 2/1969 | Shepherd | 128—268 |
| 3,470,883 | 10/1969 | Shepherd et al. | 131—10 |

SHEP K. ROSE, Primary Examiner

U.S. Cl. X.R.

128—156, 172, 260, 268; 424—19, 22, 28, 81